(No Model.)
L. WOLFF.
THIMBLE FOR COUPLING LEAD AND CAST IRON PIPES.
No. 399,720. Patented Mar. 19, 1889.
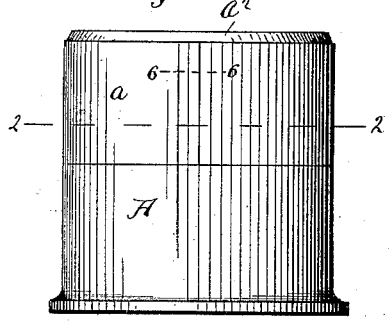
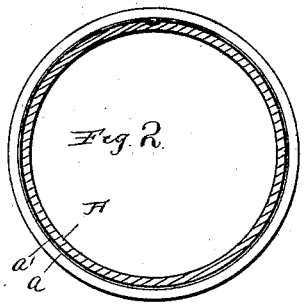
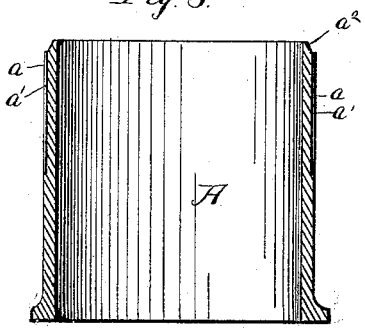
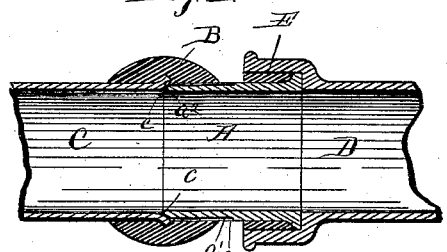
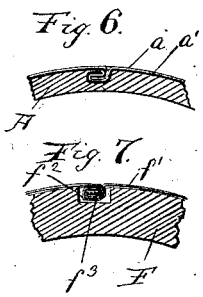
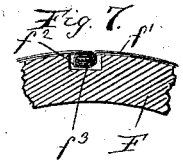
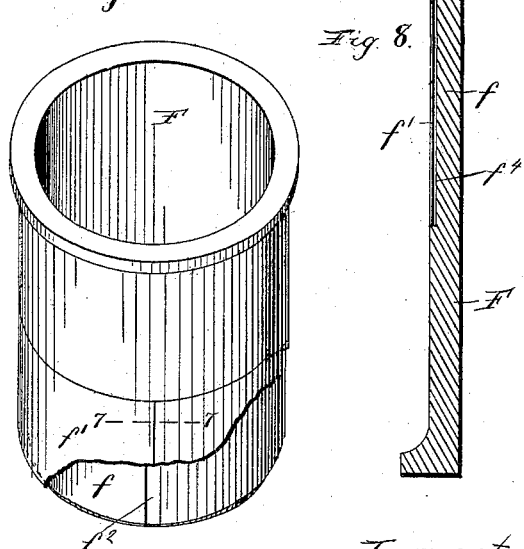
Witnesses:
Inventor:
Ludwig Wolff
By Munday Evarts & Adcock
his Atty's

UNITED STATES PATENT OFFICE.

LUDWIG WOLFF, OF CHICAGO, ILLINOIS, ASSIGNOR TO THE L. WOLFF MANUFACTURING COMPANY, OF SAME PLACE.

THIMBLE FOR COUPLING LEAD AND CAST-IRON PIPES.

SPECIFICATION forming part of Letters Patent No. 399,720, dated March 19, 1889.

Application filed February 13, 1888. Serial No. 263,762. (No model.)

*To all whom it may concern:*

Be it known that I, LUDWIG WOLFF, a citizen of the United States, residing in Chicago, in the county of Cook and State of Illinois, have invented a new and useful Improvement in Thimbles for Coupling Lead and Cast-Iron Pipes, of which the following is a specification.

My invention relates to thimbles used by plumbers for coupling lead and cast-iron pipes by a wiped or soldered joint. Heretofore such thimbles have either been made of brass or else of a lead tube and an iron or steel thimble-tube combined together mechanically or by pressure, the lead being either cast or pressed upon the iron thimble upon the inside or outside thereof and usually projecting beyond the end of the iron thimble. The brass thimbles are expensive, and to diminish their cost they are often made so light and thin that breakage or leaks from sand-holes and imperfections in the castings frequently occur, and they are also objectionable on account of the zinc in the brass injuring the solder when the same is applied to make the joint. The combined lead and iron thimbles, by reason of the merely mechanical union between the lead and iron, frequently occasion leaks between the lead and iron tubes, owing to the imperfect joining of the tubes or to the one being loosened from the other by the handling of the same or by ramming in of the packing of the outside joint, and great care has to be exercised lest the lead tubes be burned or injured by too great heat when the joint is being soldered, and with both the brass and the combined lead and iron thimbles the surface of the brass or lead requires to be cleaned or brightened by filing, shaving, or otherwise before the solder joint can be made thereon, the labor and time involved in which of course increases the expense incident to their use.

The object of my invention is to provide a thimble of a cheap and simple construction, which will obviate the difficulties experienced in the use of the brass and of the combined lead and iron thimbles heretofore employed.

To this end my invention consists in a cast-iron thimble having a metal coating fused or metallically united thereto, which metal coating is adapted or has an outer surface adapted to unite fusibly with solder, and thus form a strong and perfect solder joint.

I prefer to employ for the outer coating of the cast-iron thimble a band of ordinary tin-plate—that is, a band of sheet iron or steel coated on the outside with tin or solder or with an alloy of tin. The cast-iron thimble may, however, be coated with other suitable metal adapted to unite fusibly or metallically with solder—such, for example, as copper or brass.

The tin or solder coating to the sheet iron or steel band, which is fusibly united with the cast-iron thimble, may be applied thereto at the time the thimble is manufactured, which is the preferable way, or afterward by the plumber at the time the thimble is used.

In manufacturing my improved thimble I first place the tin-plate band on the thimble-pattern and form the mold in the sand, the tin-plate band being left in the mold when the pattern is withdrawn. The molten iron is then poured in, thus fusibly uniting the sheet iron or steel band with the cast-iron thimble at the time it is cast. The outer surface of the wrought iron or steel band thus fused to the casting is next brightened by grinding or filing, dipping in acid, or other suitable means, and then coated in the usual way with tin or solder or other suitable metal.

In the accompanying drawings, which form a part of this specification, and in which similar letters of reference indicate like parts, Figure 1 is a side elevation of the thimble embodying my invention. Fig. 2 is a cross-section on line 2 2 of Fig. 1. Fig. 3 is a longitudinal section. Fig. 4 is a longitudinal section showing the lead and iron pipes connected together by the thimble. Fig. 5 is a perspective view of the pattern used in making my improved thimble and showing the tin-plate band partially broken away. Fig. 6 is an enlarged cross-section of the thimble taken on line 6 6 of Fig. 1. Fig. 7 is an enlarged partial cross-section of the pattern and its encircling band, and Fig. 8 is an enlarged longitudinal section of the same.

In said drawings, A represents the cast-iron thimble, and *a* its encircling band or coating of metal, fusibly or metallically united therewith, the outer surface of which is adapted to unite and form a perfect joint with the solder B, forming the joint between the lead pipe C and the thimble A.

D is the iron pipe united by the packing E with the other end of the thimble A.

The coating $a$ is preferably of tin or an alloy of tin—such as solder, for example. It is, or preferably is, united to the cast thimble A through the medium of a sheet iron or steel band, $a'$, the inner surface of which is fusibly united to the thimble A at the time the thimble is cast. The tin, solder, or other metal coating, $a$, is applied to the outer surface of the sheet iron or steel band $a'$ after the casting is made. The thimble A is or should be provided with a beveled end, $a^2$, so that it will more readily enter the flaring end $c$ of the lead pipe C. When the casting A, with its soft-iron band $a'$ fused and united thereto, is dipped into the melted tin or solder for the purpose of forming the coating $a$ thereon, the coating $a$ will cover and to an extent adhere to the beveled end surface, $a^2$, of the thimble A.

F represents the pattern to be used in forming the mold for the casting A. This pattern is furnished with an end, $f$, of reduced diameter, equal to the thickness of the tin-plate band $f'$, which encircles the same. The pattern is also furnished with a longitudinal groove, $f^2$, to receive the longitudinal seam $f^3$ of the tin-plate band. Any suitable form of seam may be employed for uniting the edges of the band; but I prefer to use an ordinary folded seam, as indicated in the drawings at Fig. 7. The longitudinal groove in the pattern leaves the outer surface of the pattern and of the casting made therefrom smooth. The groove in the pattern may, however, be omitted, as a slight rib or projection on the cast thimble will not interfere with its use. The tin-plate band $f'$ fits somewhat loosely upon the pattern F, so that the pattern may be withdrawn from the mold and leave the tin-plate band therein.

The next step in the process of manufacture is to pour in the molten iron, which will fuse the surface of the tin-plate band $f'$ and weld or fusibly unite therewith. The tin coating $f^4$ on the inner side of the tin-plate band $f'$ aids in forming a perfect union between the molten metal and the soft iron or steel of the tin-plate band, the tin coating acting, perhaps, as a flux. When this tin coating is melted by contact with the molten iron, it also, of course, leaves the sheet iron or steel of the tin-plate with a clean and bright surface, adapted to fusibly unite with the molten iron poured into the mold. It is for these reasons that I employ, or prefer to employ, a tin-plate band, $f'$, instead of one of thin sheet iron or steel. A plain sheet iron or steel band may, however, be employed instead of the tin-plate band; but in this case the inner surface of the band, which comes in contact with the molten metal, should be cleaned or brightened before it is placed in the mold, in order to facilitate its fusible or metallic union with the cast thimble A when the molten iron is poured into the mold. After the casting is thus made, and the metal band $a'$ thus fusibly united with the casting A, the outer surface of the sheet iron or steel band $a'$ is first cleaned or brightened, as the tin-plate coating on the outer surface will have been destroyed by the heat, and the clean surface is retinned in the usual way by dipping it in a bath of molten tin or solder.

The coating $a$ should ordinarily extend about one-half the length of the thimble.

I hereby disclaim as not of my invention the device shown and described in Patent No. 102,443, dated April 26, 1870.

I hereby disclaim as not of my invention the device shown and described in the Patent No. 178,311 to E. A. Leland, dated June 6, 1876.

In my invention a cast-iron thimble is furnished with a soft-iron or steel band which is fusibly united and made integral with the thimble by pouring the molten iron within the soft-iron or steel band at the time the casting is formed. The sheet iron or steel band forms a part of, or lining to, the mold in which the thimble is cast. The cast thimble is thus produced with a soft-iron or steel band fused or united integrally therewith, and thus the cast-iron thimble is given a surface capable of being soldered or of receiving a perfect and thorough coating of tin or solder. The tin or solder cannot be practically or effectually united with the surface of the iron casting; but by welding or fusing the soft-iron or steel band integral with the casting I provide the same with a surface capable of being practically tinned or soldered.

I claim—

A cast-iron thimble having a soft-iron or steel band fusibly united therewith, said band being coated on the outside with tin or an alloy thereof, substantially as specified.

LUDWIG WOLFF.

Witnesses:
JOHN CLIFFORD,
ELISHA M. FORD.